(12) United States Patent
Meléndez et al.

(10) Patent No.: US 10,733,470 B2
(45) Date of Patent: Aug. 4, 2020

(54) SYSTEMS AND METHODS FOR RAPID ALIGNMENT OF DIGITAL IMAGERY DATASETS TO MODELS OF STRUCTURES

(71) Applicant: Geomni, Inc., Jersey City, NJ (US)

(72) Inventors: Ángel Guijarro Meléndez, Madrid (ES); Javier Del Río Fernández, Madrid (ES); Antonio Godino Cobo, Pinto (ES)

(73) Assignee: Geomni, Inc., Jersey City, NJ (US)

( * ) Notice: Subject to any disclaimer, the term of this patent is extended or adjusted under 35 U.S.C. 154(b) by 0 days.

(21) Appl. No.: 16/257,761

(22) Filed: Jan. 25, 2019

(65) Prior Publication Data

US 2019/0228251 A1     Jul. 25, 2019

Related U.S. Application Data

(60) Provisional application No. 62/621,746, filed on Jan. 25, 2018.

(51) Int. Cl.
*G06K 9/00*     (2006.01)
*G06K 9/32*     (2006.01)
(Continued)

(52) U.S. Cl.
CPC ......... *G06K 9/3216* (2013.01); *G06K 9/0063* (2013.01); *G06T 3/0068* (2013.01);
(Continued)

(58) Field of Classification Search
CPC ... A63F 13/5252; B64G 1/1021; G01C 11/00; G01C 11/02; G06K 2009/3225; G06K 9/0063; G06K 9/3216; G06T 15/00; G06T 15/20; G06T 15/05; G06T 19/003; G06T 2207/10048; G06T 2207/10116; G06T 2207/30181; G06T 3/4038; G06T 7/579; H04N 13/282
See application file for complete search history.

(56) References Cited

U.S. PATENT DOCUMENTS 6,735,348 B2     5/2004  Dial, Jr. et al.
6,757,445 B1 *   6/2004  Knopp ............... G01C 11/06
                                              382/154
(Continued)

OTHER PUBLICATIONS

International Search Report of the International Searching Authority dated Apr. 24, 2019, issued in connection with International Application No. PCT/US19/15153 (3 pages).
(Continued)

*Primary Examiner* — Ian L Lemieux
(74) *Attorney, Agent, or Firm* — McCarter & English, LLP

(57) ABSTRACT

Systems and methods for aligning digital image datasets to a computer model of a structure. The system receives a plurality of reference images from an input image dataset and identifies common ground control points ("GCPs") in the reference images. The system then calculates virtual three-dimensional ("3D") coordinates of the measured GCPs. Next, the system calculates and projects two-dimensional ("2D") image coordinates of the virtual 3D coordinates into all of the images. Finally, using the projected 2D image coordinates, the system performs spatial resection of all of the images in order to rapidly align all of the images.

12 Claims, 3 Drawing Sheets

(51) Int. Cl.
    *G06T 3/40*     (2006.01)
    *G06T 7/30*     (2017.01)
    *G06T 3/00*     (2006.01)

(52) U.S. Cl.
    CPC .............. *G06T 3/4038* (2013.01); *G06T 7/30* (2017.01); *G06K 2009/3225* (2013.01)

(56) References Cited

U.S. PATENT DOCUMENTS

| | | | |
|---|---|---|---|
| 7,912,320 B1* | 3/2011 | Minor | G01B 11/02 382/286 |
| 8,422,825 B1* | 4/2013 | Neophytou | G06K 9/00214 382/103 |
| 8,655,094 B2* | 2/2014 | Miller | G01C 11/04 33/503 |
| 9,466,143 B1 | 10/2016 | Walvoord et al. | |
| 10,387,582 B2* | 8/2019 | Lewis | G06T 7/12 |
| 2003/0160757 A1* | 8/2003 | Shirai | G01C 1/04 345/156 |
| 2004/0122633 A1 | 6/2004 | Bang et al. | |
| 2013/0243250 A1* | 9/2013 | France | G01C 15/00 382/103 |
| 2014/0320488 A1* | 10/2014 | Ege | G06T 17/05 345/420 |

OTHER PUBLICATIONS

Written Opinion of the International Searching Authority dated Apr. 24, 2019, issued in connection with International Application No. PCT/US19/15153 (3 pages).

* cited by examiner

SYSTEMS AND METHODS FOR RAPID ALIGNMENT OF DIGITAL IMAGERY DATASETS TO MODELS OF STRUCTURES

CROSS-REFERENCE TO RELATED APPLICATIONS

This application claims the benefit of U.S. Provisional Patent Application No. 62/621,746 filed on Jan. 25, 2018, the entire disclosure of which is expressly incorporated herein by reference.

BACKGROUND

Technical Field

The present disclosure relates generally to the fields of computer vision and photogrammetry. More specifically, the present disclosure relates to systems and methods for rapid alignment of digital imagery datasets to models of structures.

Related Art

In the fields of computer vision and photogrammetry, there is often a need to rapidly align digital images (e.g., aerial images of a building, a structure, property, etc.) to an existing computer model of a structure such as a wireframe model of a house, building, etc. Unfortunately, this process is often time-consuming and requires manual alignment of each image in a dataset by a user.

In order to align digital images, it is necessary to determine the external orientation parameters of the images. There are various techniques for determining the external orientation parameters of aerial images. For example, some techniques involve measuring ground control points that appear in the aerial images using a bundle block adjustment ("BBA") technique. The BBA technique calculates the exterior orientation of all images of a block, using as input accurate approximate values of the unknowns. Another technique called spatial resection ("SR") allows for the calculation of these parameters for each image separately, using as input even poor approximate values for the unknowns.

It has been found that the BBA technique is not always optimal for all situations, due to differences in input and output requirements of various imaging/vision systems. Additionally, standard SR techniques are not always computationally efficient because each image must be treated separately by the computer system and/or by a user of the computer system. As such, there is a need for computational systems/methods which allow SR to be performed on all images in a block (e.g., two or more images) with minimal effort on behalf of the user. The systems and methods disclosed herein address these and other needs by rapidly aligning datasets of images to a model while requiring minimal user input.

SUMMARY

This present disclosure relates to systems and methods for aligning digital image datasets to a computer model of a structure. The system receives two reference aerial images from an input image dataset. Then, in the two aerial images, three common ground control points ("GCPs") are identified in the images (e.g., by a user manually identifying the GCPs using in the images using a graphical user interface tool and marking the GCPs on the computer display of the images, or by the computer system automatically identifying the GCPs using computer vision techniques). Once the GCPs are identified, the system then calculates virtual three-dimensional ("3D") coordinates of the measured GCPs. Then, the system calculates and projects two-dimensional ("2D") image coordinates of the virtual 3D coordinates in all the images (e.g., in all aerial images currently being displayed to the user on a display of the computer system, or in other images). Finally, using the projected 2D image coordinates, the system performs spatial resection of all of the images in order to rapidly align all of the images.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to systems and methods for rapidly aligning digital imagery datasets to a computer model of a structure, as discussed in detail below in connection with FIGS. 1-3.

Figure 1:
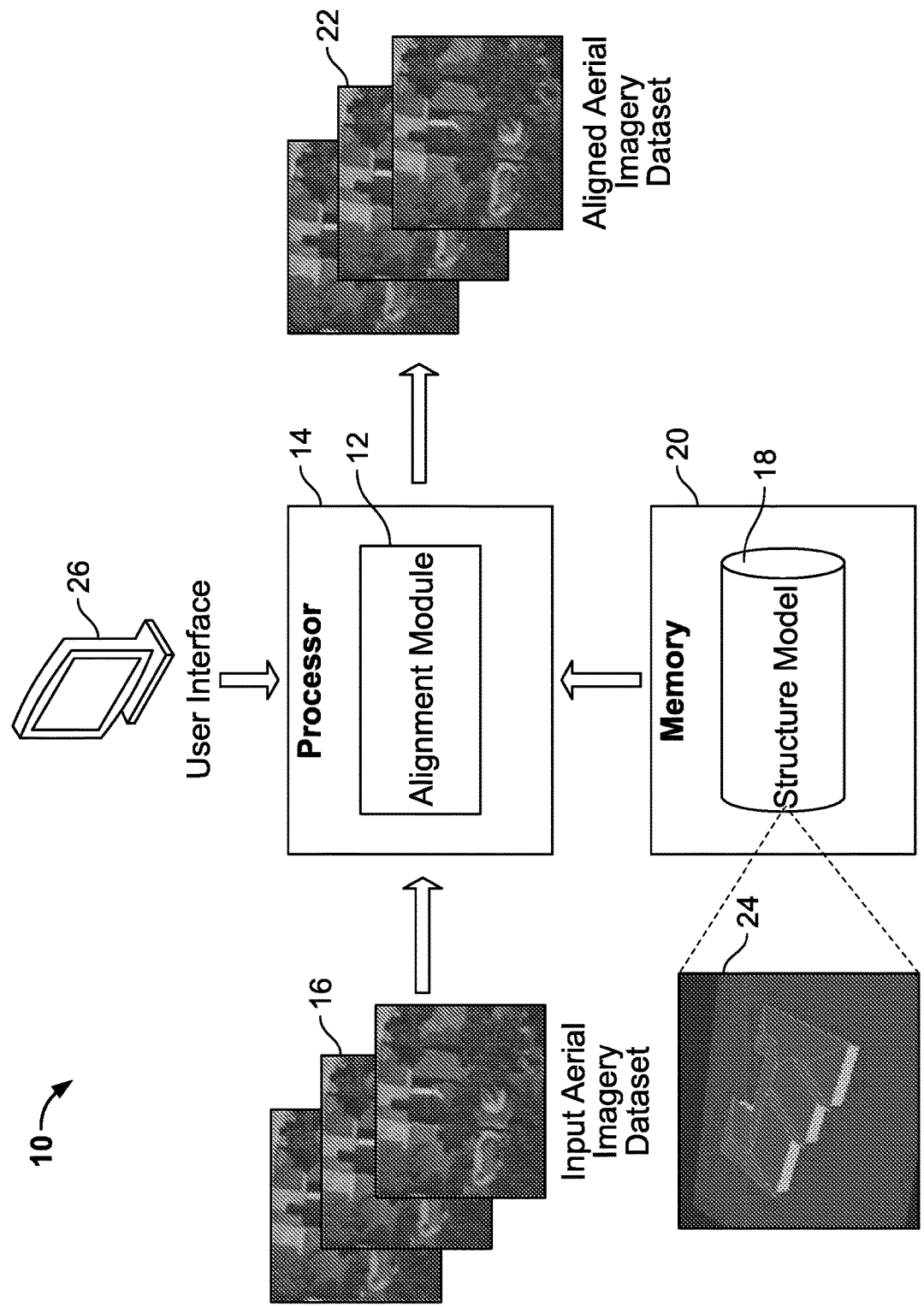
FIG. 1 is a diagram illustrating the system of the present disclosure.
Figure 2:
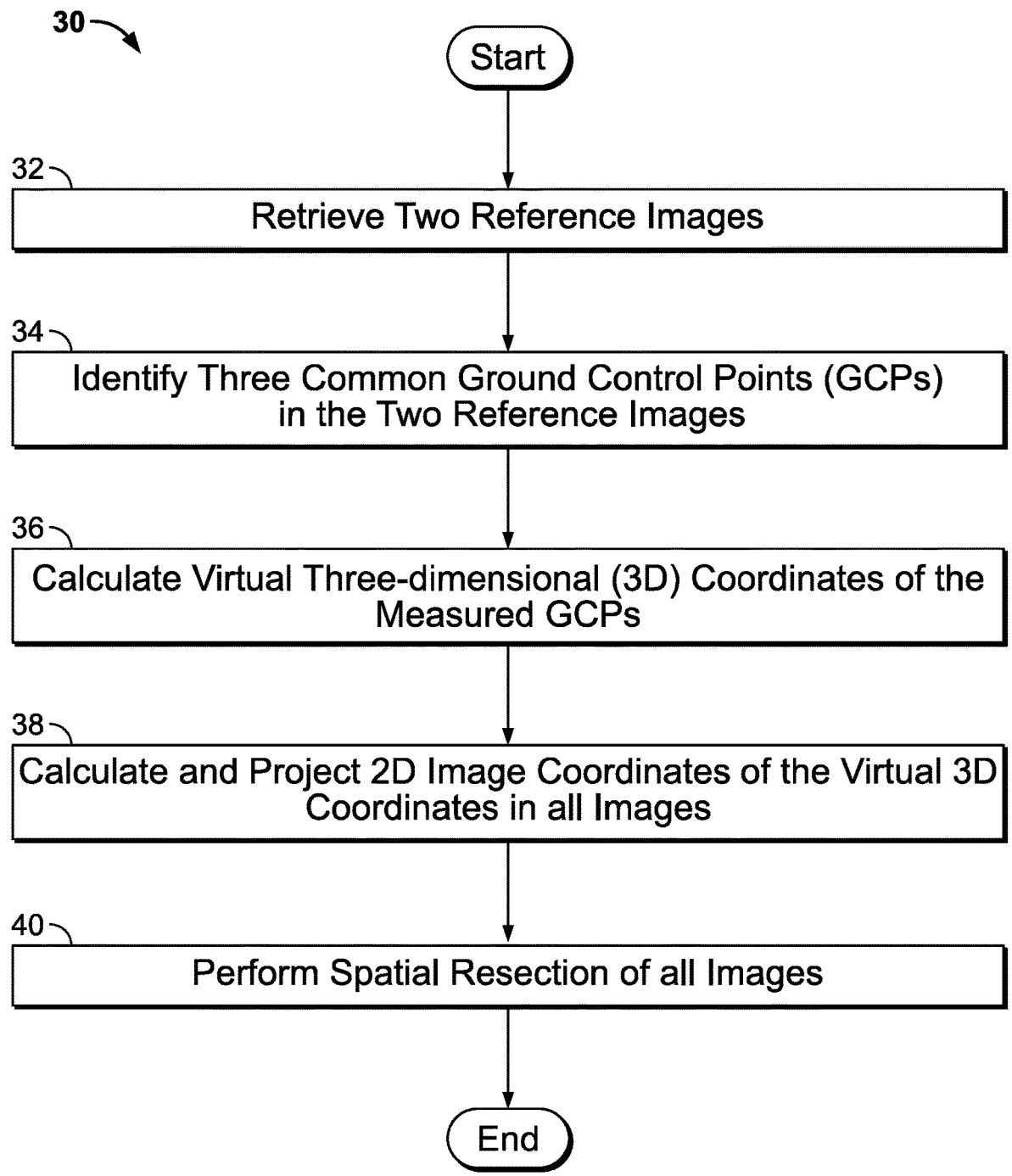
FIG. 2 is a flowchart illustrating processing steps carried out by the system.

FIG. 1 is a diagram illustrating the system of the present disclosure, indicated generally at 10. The system 10 includes an alignment software module 12 that is executed by a processor 14 and which processes a plurality of digital images in a dataset, such as an input aerial imagery dataset 16, a structure model 18 stored in a memory 20 in communication with the processor 14, and a user interface 26 that communicates with the processor 14 and which can be operated by a user of the system 10. The structure model 18 could include a wireframe or polygonal model 24 of a structure, such as a three-dimensional model of a house as shown. Importantly, the system 10 rapidly aligns the input aerial imagery dataset 16 (which includes multiple images) to the model 18 to produce an aligned aerial imagery dataset 22 requiring minimal input from the user using the user interface 26. The user interface 26 could include, but is not limited to, a display and associated keyboard and/or mouse, a touchscreen, lightpen, etc. Moreover, the process steps of the invention disclosed herein (carried out by the module 12) could be embodied as computer-readable software code executed by one or more computer systems, and could be programmed using any suitable programming languages including, but not limited to, C, C++, C#, Java, Python, or any other suitable languages. Additionally, the computer system(s) on which the present invention could be embodied include, but are not limited to, one or more personal computers, servers, mobile devices, cloud-based computing platforms, etc., each having one or more suitably powerful microprocessors and associated operating system(s) such as Linux, UNIX, Microsoft Windows, MacOS, etc. Still further, the invention could be embodied as a customized hardware component such as a field-programmable gate array (FPGA), application-specific integrated circuit (ASIC), embedded system, or other customized hardware component without departing from the spirit or scope of the present disclosure.

The specific functions carried out by the system 10 (and in particular, the alignment module 12) will now be discussed with reference to FIG. 2, which is a flowchart 30 illustrating processing steps carried out by the system of the present disclosure. In step 32, the system retrieves two reference images from a digital imagery dataset, such as the input aerial imagery dataset 16 of FIG. 1, and displays the reference images to the user on a screen of the user interface 26. In step 34, using the user interface 26 and a suitable graphical component such as a visual marker displayed on the interface 26, the user identifies and marks three common ground control points (GCPs) in the two reference images. It is noted that this step could be carried out automatically by the system 10, such that the system could automatically identify the GCPs in the reference image using suitable computer vision techniques, and that user input need not be required. However, in the event that user input is utilized, such user input is minimized in comparison to conventional techniques due to the processing steps carried out herein.

In step 36, the system calculates virtual three-dimensional (3D) coordinates of the GCPs identified in the reference images. Then, in step 38, the system calculates and projects two-dimensional (2-D) image coordinates of the virtual 3D coordinates in all of the images of the dataset 16. Finally, in step 40, the system 10 performs a spatial resection process on each image in the dataset using the projected 2-D image coordinates of the virtual 3D coordinates as well as the images themselves, to automatically align each image in the dataset 16 to produce the aligned image dataset 22. Importantly, by calculating the virtual 3D coordinates, projecting them into the images, and automatically performing spatial resection on the images, the system significantly reduces user input and rapidly aligns the images of the dataset 16, in batch.

Figure 3:
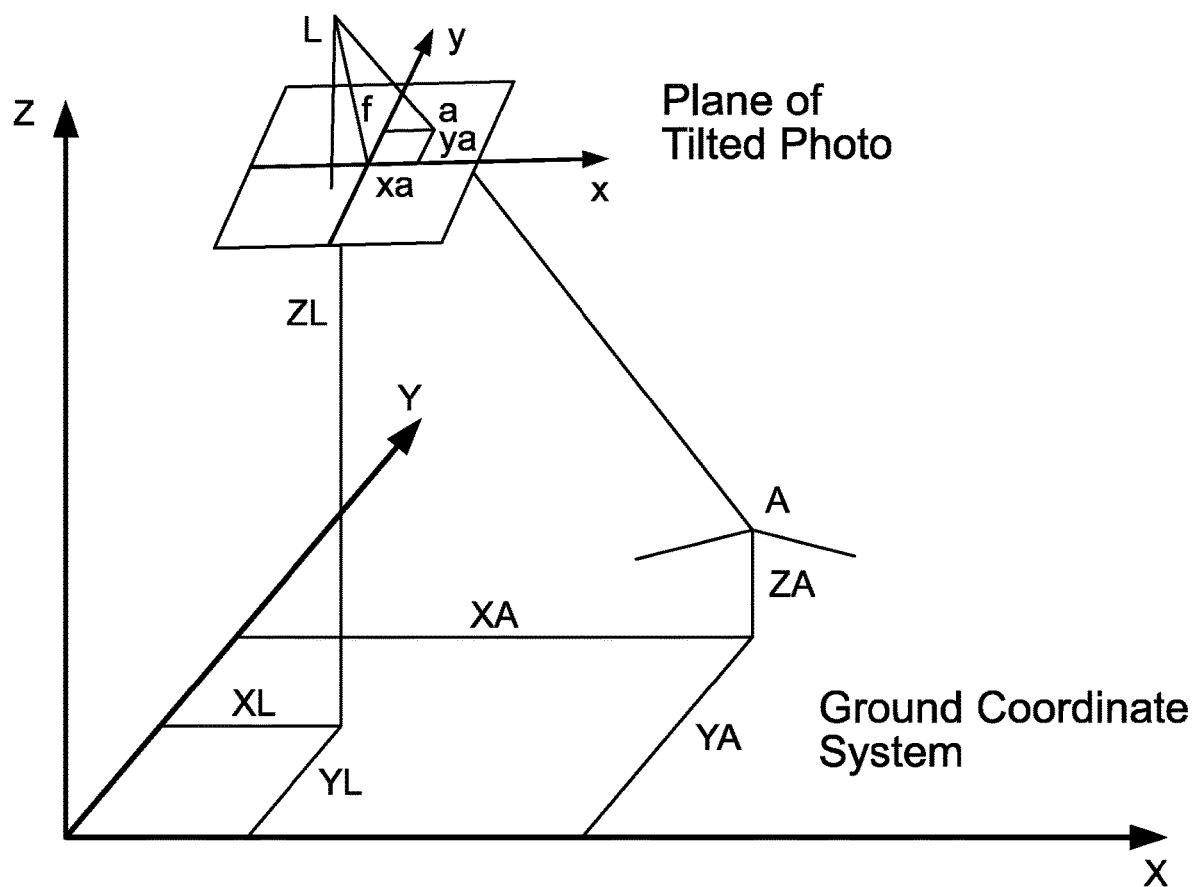
FIG. 3 is a diagram illustrating a spatial resection step carried out by the system to align images.

FIG. 3 illustrates a spatial resection technique that could be utilized by the system 10 in order to perform spatial resection on each image in step 40. By way of background, the line that joins the focal point of the camera, a GCP and its homologous 2D point in the image, is described by the collinearity equations:

$$x - x_0 = -f \frac{a_1(X - X_s) + b_1(Y - Y_s) + c_1(Z - Z_s)}{a_3(X - X_s) + b_3(Y - Y_s) + c_3(Z - Z_s)}$$

$$y - y_0 = -f \frac{a_2(X - X_s) + b_2(Y - Y_s) + c_2(Z - Z_s)}{a_3(X - X_s) + b_3(Y - Y_s) + c_3(Z - Z_s)}$$

The external orientation (EO) parameters of the images can be calculated by solving these collinearity equations. EO parameters are a group of 6 unknowns and each GCP generates 2 equations. In order to calculate an image's EO parameters, there is a minimum requirement of 3 GCPs measured per image. In other words, in a standard spatial resection ("SR") tool, the minimum user effort is 3*Number_Of_Images. However, the system of the present invention reduces the minimum user effort (e.g., to a fixed value of 6), because the user is requested to measure only 3 points in 2 images; then, the system propagates the measurements to all images in the dataset, allowing spatial resection to automatically be performed on each image in the dataset. Also, as noted above, if computer vision techniques are applied to automatically identify the GCPs (e.g., in step 34 of FIG. 2), the user need not manually identify the GCPs at all.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is intended to be protected by Letters Patent is set forth in the following claims.

The invention claimed is:

1. A method for automatically aligning each image in a dataset to produce an aligned image dataset, comprising:
   retrieving a plurality of reference images from a digital imagery dataset;
   displaying the plurality of reference images to a user on a user interface;
   identifying common ground control points ("GCPs") in the plurality of reference images;
   calculating virtual three-dimensional coordinates of the GCPs identified in the plurality of reference images;
   calculating and projecting two-dimensional image coordinates of the virtual three-dimensional coordinates into each image of the dataset; and
   performing spatial resection on each image in the digital imagery dataset to align each image using the projected two-dimensional image coordinates.

2. The method of claim 1, wherein the digital imagery dataset comprises an aerial imagery dataset.

3. The method of claim 1, wherein step of identify the common GCPs comprises the user manually identifying the GCPs using a graphical user interface tool and marking the GCPs on the user interface.

4. The method of claim 1, wherein step of identify the common GCPs comprises a computer system automatically identifying the GCPs using computer vision techniques.

5. The method of claim 1, wherein step of perform spatial resection on each image comprises calculating external orientation parameters using collinearity equations.

6. The method of claim 5, wherein the collinearity equations comprise:

$$x - x_0 = -f \frac{a_1(X - X_s) + b_1(Y - Y_s) + c_1(Z - Z_s)}{a_3(X - X_s) + b_3(Y - Y_s) + c_3(Z - Z_s)}$$

$$y - y_0 = -f \frac{a_2(X - X_s) + b_2(Y - Y_s) + c_2(Z - Z_s)}{a_3(X - X_s) + b_3(Y - Y_s) + c_3(Z - Z_s)}.$$

7. A system for automatically aligning each image in a dataset to produce an aligned image dataset, comprising:
   a processor in communication with a user interface and a database comprising a digital imagery dataset; and
   computer system code executed by the processor, the computer system code causing the processor to:
   retrieve a plurality of reference images from the digital imagery dataset;
   display the plurality of reference images to a user on the user interface;
   identify common ground control points ("GCPs") in the plurality of reference images;
   calculate virtual three-dimensional coordinates of the GCPs identified in the plurality of reference images;
   calculate and project two-dimensional image coordinates of the virtual three-dimensional coordinates into each image of the dataset; and perform spatial resection on each image in the digital imagery dataset to align each image using the projected two-dimensional image coordinates.

8. The system of claim 7, wherein the digital imagery dataset comprises an aerial imagery dataset.

9. The system of claim 7, wherein step of identify the common GCPs comprises the user manually identifying the GCPs using a graphical user interface tool and marking the GCPs on the user interface.

10. The system of claim 7, wherein step of identify the common GCPs comprises the system automatically identifying the GCPs using computer vision techniques.

11. The system of claim 7, wherein step of perform spatial resection on each image comprises calculating external orientation parameters using collinearity equations.

12. The system of claim 11, wherein the collinearity equations comprise:

$$x - x_0 = -f \frac{a_1(X - X_s) + b_1(Y - Y_s) + c_1(Z - Z_s)}{a_3(X - X_s) + b_3(Y - Y_s) + c_3(Z - Z_s)}$$

$$y - y_0 = -f \frac{a_2(X - X_s) + b_2(Y - Y_s) + c_2(Z - Z_s)}{a_3(X - X_s) + b_3(Y - Y_s) + c_3(Z - Z_s)}.$$

* * * * *